(No Model.)

W. P. BROWN.
Axle Skein.

No. 239,220. Patented March 22, 1881.

WITNESSES
John H. Ellis.
Philip C. Masi.

INVENTOR
W. P. Brown
by J. C. Smith
his ATTORNEY

N. PETERS, PHOTO-LITHOGRAPHER, WASHINGTON, D. C.

UNITED STATES PATENT OFFICE.

WILLIAM P. BROWN, OF ZANESVILLE, OHIO.

AXLE-SKEIN.

SPECIFICATION forming part of Letters Patent No. 239,220, dated March 22, 1881.

Application filed October 16, 1880. (No model.)

*To all whom it may concern:*

Be it known that I, WILLIAM P. BROWN, a citizen of the United States, resident at Zanesville, in the county of Muskingum and State of Ohio, have invented certain new and useful Improvements in Axle-Skeins; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
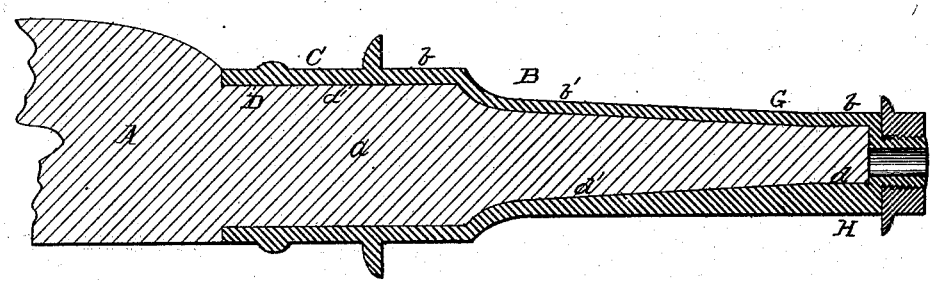
Figure 2:
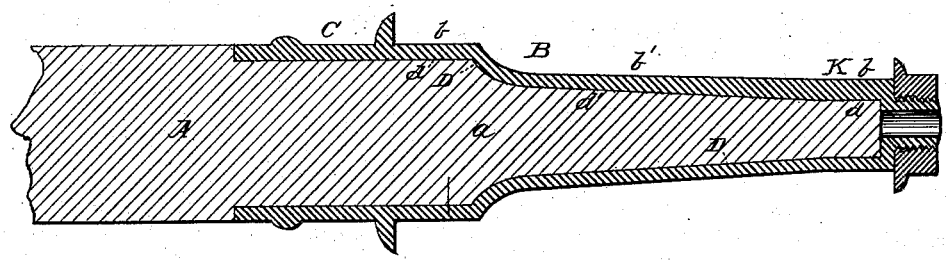
Figure 3:
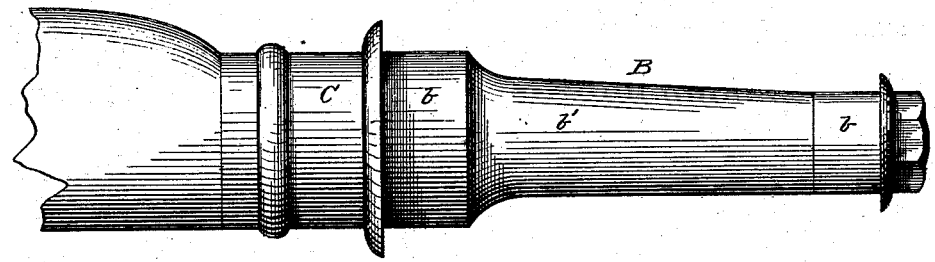
Figure 4:
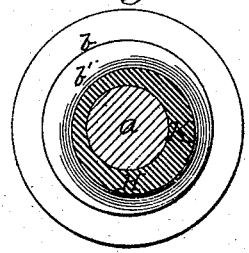

Figure 1 represents a vertical section of this invention. Fig. 2 is a horizontal section. Fig. 3 is a front view, and Fig. 4 is a vertical cross-section.

This invention relates to that class of devices known as axle-skeins.

Heretofore in this class of devices it has been customary to make the interior or socket portion of the skein of tapering form, wherein there are serious defects, which will be pointed out hereinafter.

It is the object of the present invention to overcome the objections incident to the form of inner bearings employed in fastening skeins upon axles, and which have impaired their use. It is to these inner bearings which fit corresponding ones upon the axle that my device pertains. The tapering form heretofore given to these sockets has rendered the skein liable to work loose and slip off. By making the end bearings cylindrical or parallel this danger is avoided, for by giving the wooden arm a neat fit any strain of the wheel in running from the collar would not have the same tendency to shove a cylindrical-shaped skein off as a tapering one; and moreover such cylindrical skein could not slip off till it reached the end of the bearing. By extending the arm the same dimension out into the skein beyond the collar it is much stronger and better able to resist strain at this important point, where the thrust comes.

From the construction of the interior of the skein, as described, the necessary gather and pitch are given without affecting the wood of the axle. This is done in the skein itself without interfering with the strength of the wooden arm of the axle. The journal part of the skein is thrown slightly forward and down, the socket part for the axle-arm remaining straight with said arm, whereby said arm extends within said skein symmetrically—that is, the portions upon both sides of the arm's axis are alike. By making the skein thus the top and rear sides have longer bearings than the bottom and front, and the latter have more metal. This renders the skein better for wear. The top and rear, being longer, are stronger to resist thrust, and the bottom and front, being thicker, stand wear better—the former in traveling, the latter when brakes are applied.

In the annexed drawings, A is the wooden axle, having arm $a$. B is the skein, having collar portion C fitting over the axle-body, and socket D to receive arm $a$. The exterior of the journal part of the skein has the cylindrical bearings $b\ b$ for wear and the tapered recess $b'$ for lubricant. The socket D is arranged on a straight line with the grain of the axle, and has two cylindrical seats or bearings, $d\ d$, and the taper $d'$, which fit corresponding portions of the axle-arm $a$. This socket D is made solely with regard to this important point—namely, to preserve the straight position of the axle-arm—the taper being made entirely in the skein itself, whereby the strength of the arm is preserved intact and enters the skein with its fibers in their normal condition.

G represents the gather to the skein, and H thickening upon the opposite side, which is produced by my method of construction. From this it will be seen that the wood of the axle extends into the skein unaffected by the gather or pitch given to the same, this being made entirely in the skein itself, and for this purpose they will have to be cast upon a right and left hand pattern.

The pitch to the arm is given by a construction similar to that which produces the gather, a thickening being effected at K.

What I claim is—

1. An axle-skein having the interior cylindrical seats or bearings, $d\ d$, and the intervening taper $d'$.

2. An axle-skein having two cylindrical and an intervening tapering bearing on the inside, and having its shell thicker underneath than on top, whereby the skein is adapted to fit the axle-arm symmetrically and have the gather in itself alone.

In testimony whereof I affix my signature in presence of two witnesses.

WILLIAM P. BROWN.

Witnesses:
G. W. ALLEN,
DANIEL B. GARY.